June 30, 1925.  
A. F. BLACK  
SHOCK ABSORBER  
Filed Oct. 3, 1923

INVENTOR  
Arthur F. Black  
BY Arthur P. Slee  
ATTY

June 30, 1925.

A. F. BLACK

SHOCK ABSORBER

Filed Oct. 3, 1923

INVENTOR
Arthur F. Black
BY Arthur L. Slee
ATTY

Patented June 30, 1925.

1,543,979

UNITED STATES PATENT OFFICE.

ARTHUR F. BLACK, OF SELBY, CALIFORNIA.

SHOCK ABSORBER.

Application filed October 3, 1923. Serial No. 666,339.

*To all whom it may concern:*

Be it known that I, ARTHUR F. BLACK, a citizen of the United States, residing in Selby, in the county of Contra Costa and State of California, have invented a new and useful Improvement in a Shock Absorber, of which the following is a specification.

My invention relates to improvements in shock absorbers for automobiles and the like wherein the ends of leaf springs normally supporting the weight of an automobile body are resiliently supported with respect to the axle of the automobile.

The present invention is particularly directed to the provision of an improved shock absorber adapted for mounting in connection with the front axle and springs of Ford automobiles, and trucks, the primary object being to provide increased resilience, to absorb vibration and to retard the movement of the frame and body in either direction relative to the axle.

Another object is to provide an improved device which can be readily installed in connection with the standard fittings of the automobile without altering any part thereof.

A further object is to provide a device wherein the resilience of absorber springs is added to the resilience of the standard springs and at the same time afford a greater range of movement through which the standard springs may move.

A still further object is to provide an improved device of simple and rugged construction which may be manufactured and installed at an economical cost.

I accomplish these and other objects by means of the device disclosed in the drawings forming a part of the present specification wherein like characters of reference are used to designate similar parts throughout said specification and drawings and in which, Fig. 1 is a broken front elevation of an automobile showing the manner in which my improved shock absorbers are connected between the axle and the ends of the spring.

Figure 1:
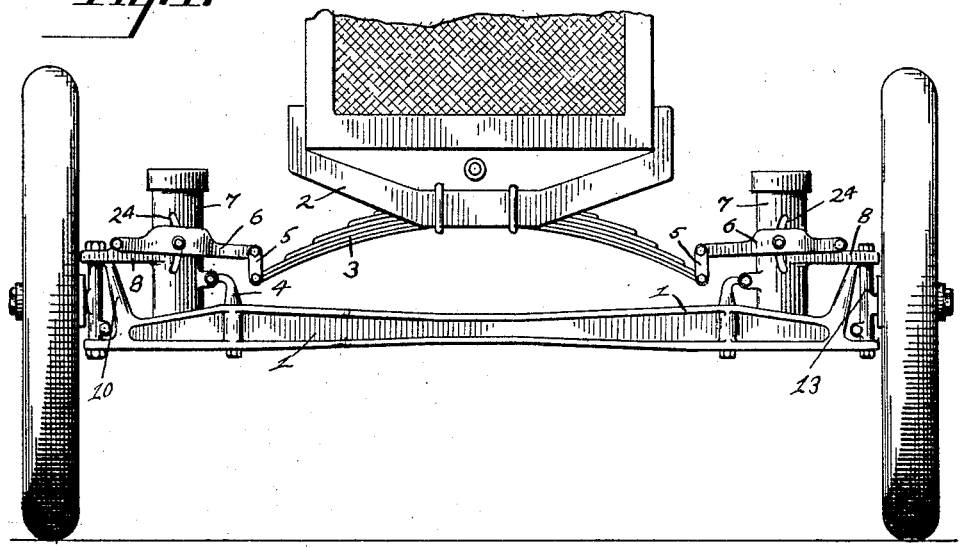
Figure 2:
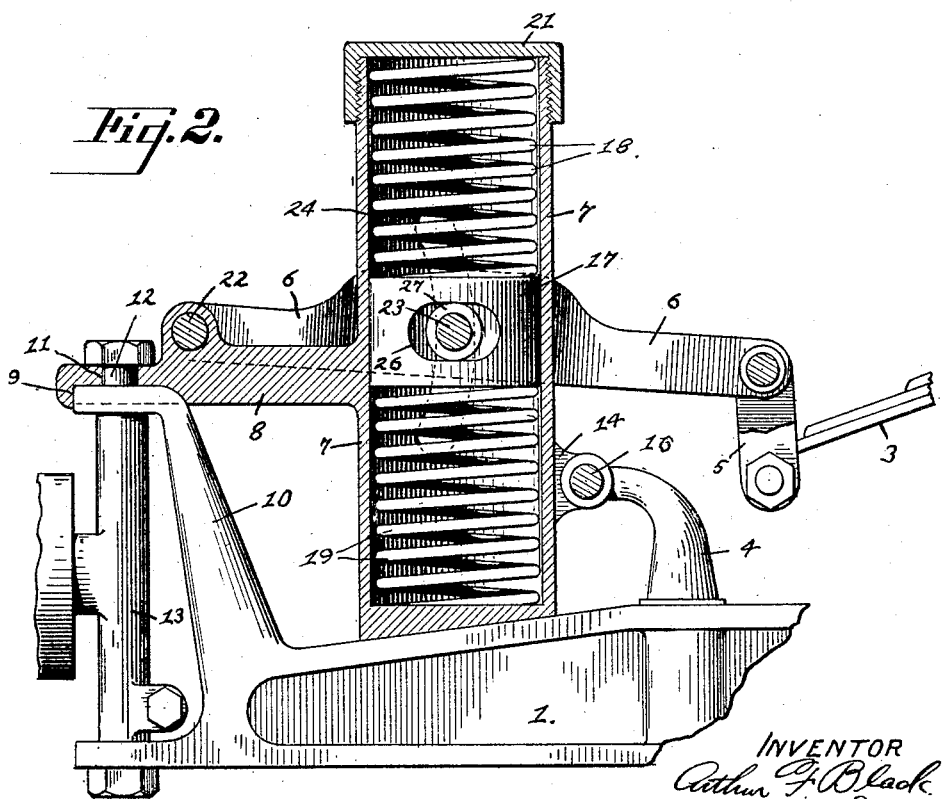
Fig. 2 is a vertical section of the shock absorber showing the manner in which it is secured upon the end of the axle.
Figure 3:
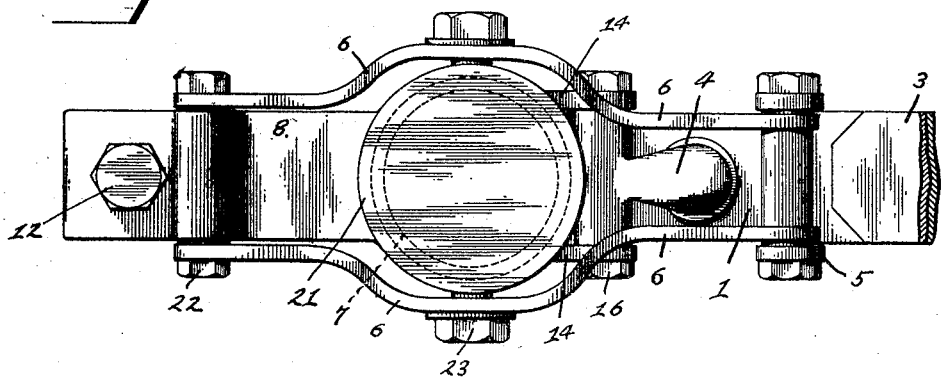
Fig. 3 is a plan view of the device as shown in Fig. 2.

Referring to the drawings the numeral 1 is used to designate in general the front axle of a Ford automobile above which is supported the frame 2 and body of the automobile by means of a transversely disposed leaf spring 3. In the standard construction the ends of the spring 3 are connected to the ends of spring perches 4 by means of suitable shackles. The perches 4 are bolted directly onto the upper side of the axle and form rigid mountings for the ends of the spring 3, only a relatively slight amount of play being afforded the spring with the result that only a relatively small amount of resilience will be afforded.

In my invention the spring 3 is disconnected from the perches 4 and connected by means of ordinary shackles 5 upon the ends of resiliently supported arms 6 pivotally connected to the body portion of my improved shock absorber.

In the preferred construction illustrated in the drawings my improved shock absorber consists of a cylindrical body portion 7 having a lateral extension 8 the outer end of which is recessed upon the under side as at 9 to fit over the top of the forked end 10 of the axle 1. The extension has an aperture 11 formed therein to receive the spindle bolt 12 by which the spindle 13 is normally secured upon the end of the axle. The body 7 is also provided with a pair of lugs 14 arranged to span the end of the adjacent perch 4 which is turned to point outwardly toward the end of the axle and away from the end of the spring to which it was formerly connected, said lugs being rigidly secured to the perch by means of a suitable bolt 16 extending through the lugs and the perch.

A plunger 17 is slidably mounted within the cylindrical body portion 7, and springs 18 and 19 are mounted above and below the plunger, the lower spring being engaged between the plunger and the bottom of the body while the upper spring is engaged between the plunger and a removable cap 21 threaded or otherwise secured upon the top of the body.

The arms 6 are pivotally mounted at one end upon the extension 8 by means of a suitable bolt 22, the opposite end being connected to the adjacent end of the spring 3 by means of the usual shackle 5. A pin 23 is secured between the arms 6 at their approximate centers, said pin being extended through arcuate slots 24 formed in the sides of the body 7 and through a transverse slot 26 formed in the plunger 17. A roller 27 is mounted upon the pin 23 within the plunger 27 to facilitate the transverse movement of the pin within the plunger as hereinafter more fully described.

The operation of my improved shock absorber is as follows: Absorbers being secured upon the ends of the axle and connected to the ends of the springs as above described, it will be noted that the ends of the leaf spring 3 will be supported upon the ends of the arms 6 which in turn are resiliently supported between the absorber springs 18 and 19. The weight carried upon the leaf spring 3 will thus be supported upon the end of the resiliently supported arms 6. By this arrangement much of the vibration commonly imparted directly to the leaf spring 3 and thence to the frame and body of the automobile will be taken up by the absorber springs. At the same time, a greater amount of movement is afforded the leaf spring 3 and the resilience of the absorber springs 18 and 19 added to the resilience of the spring 3 in resisting greater shocks. In this connection it is to be noted that the slots 24 are made long enough to accommodate a pivotal movement of considerable length whereby the arms may be depressed to compress the spring 19 sufficient to gradually retard the downward movement of the spring 3 and the frame 2. The spring 3 operates in its usual manner with the exception that the free movement of the shackle 5 and the movement of the arms 6 permit the spring to be distorted to a greater extent under a sever shock. As the springs and arms 6 return to normal position after a shock, the upper absorber springs 18 retard the upward movement of the arms and thereby prevents the sudden whip back which is often more annoying than the initial shock. The upper springs also serve to effectually resist an upward movement upon either side of the automobile and thereby prevent side sway.

The plunger 17 is made sufficiently long to insure against binding and the roller 27 is provided to reduce friction and insure free transverse movement of the pin within the slot 26 when the arms 6 are moved pivotally about the pivot mounting 22.

Figure 4:
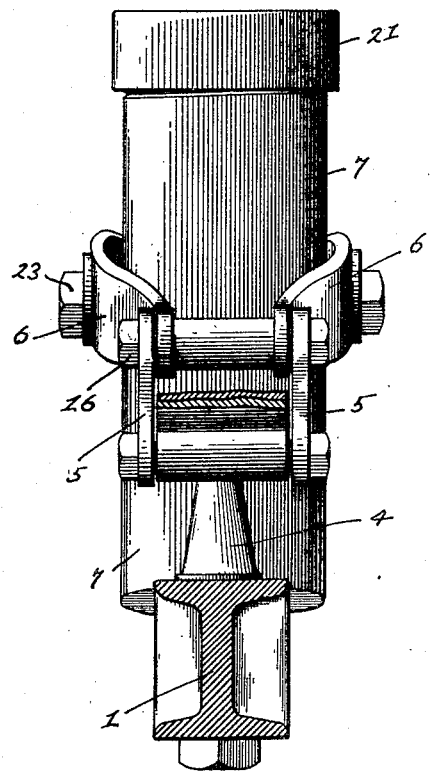
Fig. 4 is a right side elevation of the device as shown in Figs. 2 and 3.

By providing the recess 9 in the end of the extension 8 the extension may be made of adequate strength and at the same time permit the extension to receive and be secured by the standard spindle bolt 12 as best shown in Fig. 4 of the drawings, thereby permitting the body to be rigidly secured upon the axle by means of parts forming the standard equipment of the automobile.

From the above description it will be seen that my improved shock absorber consists of relatively few parts all of which may be made of sufficient strength to withstand the severe strain shown upon such a device. In applying the device the axle and spring 3 remain unaltered. The absorber springs 18 and 19 mark the points at which the weight of the frame and body of the automobile is suspended, and as these points are positioned near the ends of the axle a greater stability will be obtained than is possible with the ordinary spring mountings, which stability combines with the resistance of the springs 18 and 19 in resisting any side sway of the automobile.

While I have illustrated and described what I now deem to be the preferred form of my invention and have illustrated it only in connection with the front axle and spring of a Ford automobile, the device is of course subject to modification in a number of ways without departing from the spirit of my invention. I therefor do not wish to restrict myself closely to the disclosure hereincontained but desire to avail myself of all modifications which may fall within the scope of the appended claims.

Having thus described my invention what I claim as new and desire to secure by Letters Patent is:

1. A shock absorber comprising a body rigidly secured upon the axle of an automobile; a pair of arms having one end pivotally connected upon the body; a shackle pivotally connecting the other end of the arm to a spring supporting the frame of said automobile above said axle; a plunger slidably mounted within the absorber body; springs mounted above and below the plunger; and a pin secured between the arms and engaging the plunger whereby a pivotal movement of the arms will move the plunger against the resistance of one of the springs to absorb vibration and to retard movement of the frame relative to the axle, said pin extending between the arms through arcuate slots formed in the sides of the body and through a transverse slot formed in the plunger to accommodate the arcuate movement of the arms about the pivot mounting thereof.

2. A shock absorber comprising a body rigidly secured upon the axle of an automobile; a pair of arms having one end pivotally connected upon the body; a shackle pivotally connecting the other end of the arm to a spring supporting the frame of said automobile above said axle; a plunger slidably mounted within the absorber body; springs mounted above and below the plunger; and a pin secured between the arms and engaging the plunger whereby a pivotal movement of the arms will move the plunger against the resistance of one of the springs to absorb vibration and to retard movement of the frame relative to the axle, said pin extending between the arms through arcuate slots formed in the sides of the body and through a transverse slot formed in the plunger to accommodate the arcuate movement of the arms about the pivot mounting thereof; and a roller mounted upon the pin and engaging the transverse slot formed in the plunger to facilitate transverse movement of the pin within the plunger.

3. A shock absorber comprising a cylindrical body having an extension adapted to be rigidly secured upon one end of an automobile axle by means of the spindle bolt thereof and also having lugs upon the opposite side of the body to be rigidly secured upon a spring perch secured upon said axle; a plunger mounted within the cylindrical body; springs mounted above and below the plunger; and means pivotally connected between the body and the adjacent end of a leaf spring supporting the frame of the automobile above the axle and connected to the plunger whereby the weight carried by the leaf spring will be supported resiliently between the absorber springs, to absorb vibration and retard movement of the frame in either direction relative to the axle.

4. A shock absorber comprising a cylindrical body having an extension recessed to engage the forked end of an axle of an automobile and apertured to receive the spindle bolt of said axle whereby the body may be rigidly secured to the axle: a plunger slidably mounted within the cylindrical body; springs mounted above and below the plunger; and means pivotally connected between the body and the adjacent end of a leaf spring supporting the frame of the automobile and connected to the plunger whereby the weight carried by the leaf spring may be resiliently supported between the absorber springs to absorb vibration and retard movement of the frame in either direction relative to the axle.

5. A shock absorber comprising a cylindrical body having an extension recessed at the outer end upon the under side thereof to engage the forked end of the axle of an automobile and apertured to receive the spindle bolt of said axle whereby the body may be rigidly secured upon the axle; a pair of lugs formed upon the body upon the side opposite the extension to be rigidly secured to the outwardly turned end of a spring perch mounted upon the axle; a plunger mounted within the cylindrical body; springs mounted within the body above and below the plunger; and means pivotally connected between the body and the adjacent end of a leaf spring supporting the frame of the automobile and connected to the plunger whereby the weight carried by the leaf spring will be resiliently supported between the absorber springs to absorb vibration and retard movement of the frame in either direction relative to the axle.

6. A shock absorber comprising a cylindrical body having an extension recessed at the outer end upon the under side thereof to engage the forked end of the axle of an automobile and apertured to receive the spindle bolt of said axle, said body also having lugs formed upon the side opposite the extension to be connected to the outwardly turned end of a spring perch mounted upon the axle whereby the body may be rigidly secured upon the end of the axle; a plunger mounted within the cylindrical body; springs mounted within the body above and below the plunger; a pair of arms pivotally secured at one end thereof upon the extension; a shackle pivotally connecting the opposite end of the arms to the adjacent end of a leaf spring supporting the frame of the automobile above the axle; and a pin secured between the arms and connected to the plunger, said pin extending through slots formed in the sides of the body and in the plunger to permit movement of the arms and plunger relative to the body whereby the weight carried by the leaf spring will be resiliently supported between the absorber springs to absorb vibration and retard movement of the frame in either direction relative to the axle.

7. A shock absorber comprising a cylindrical body having an extension recessed at the outer end upon the side thereof to engage the forked end of the axle of an automobile and apertured to receive the spindle bolt of said axle, and also being provided with a pair of lugs formed upon the side opposite the extension to be secured to a spring perch secured upon the axle whereby the body may be rigidly secured upon said axle, said body having arcuate slots formed in the sides thereof; a transversely slotted plunger slidably mounted within the cylindrical body; springs mounted within the body above and below the plunger; a pair of arms pivotally connected at one end thereof upon the extension; a shackle connecting the opposite end of the arms to the adjacent end of a leaf spring supporting the frame of the automobile above the axle; a pin secured between the arms at their approximate centers and extending through the slots of the body and the plunger to permit pivotal movement of the arms relative to the body whereby the weight carried by the leaf spring will normally be resiliently supported between the absorber springs to absorb vibration and to retard movement of the frame in either direction relative to the axle; and a roller mounted upon the pin and engaging the transverse slot in the plunger to facilitate transverse movement of the pin within the plunger.

In witness whereof I hereunto set my signature.

ARTHUR F. BLACK.